May 25, 1948.  R. G. HEITZ ET AL  2,442,324
PROCESS OF MAKING CARBON TETRACHLORIDE AND PERCHLORETHYLENE
Filed Jan. 22, 1945
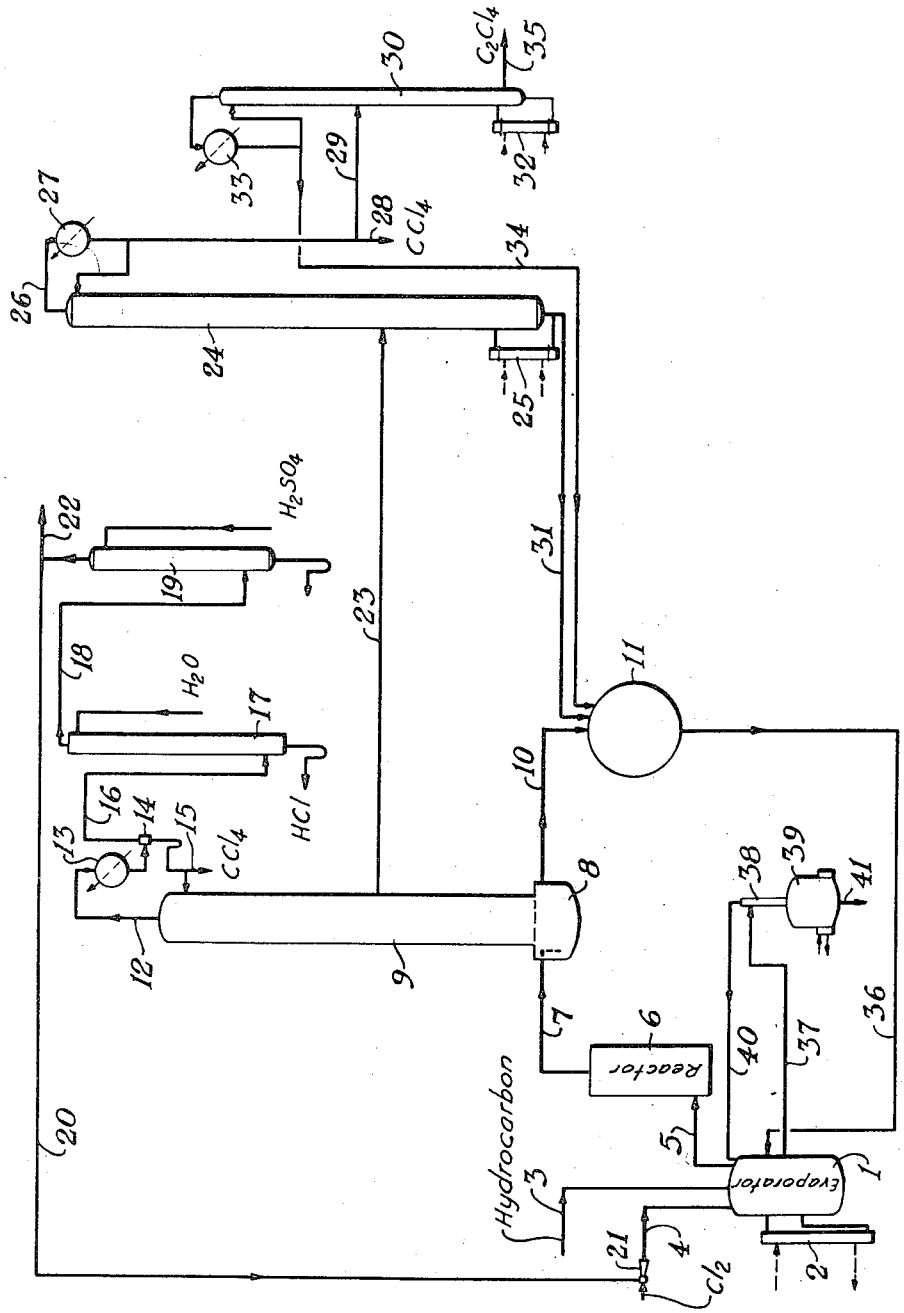
INVENTORS
Robert G. Heitz
BY William E. Brown
Griswold & Burdick
ATTORNEYS

UNITED STATES PATENT OFFICE 2,442,324

PROCESS OF MAKING CARBON TETRACHLORIDE AND PERCHLORETHYLENE

Robert G. Heitz and William E. Brown, Antioch, Calif., assignors to The Dow Chemical Company, Midland, Mich., a corporation of Delaware Application January 22, 1945, Serial No. 573,986

10 Claims. (Cl. 260—654)

The invention relates to processes for making carbon tetrachloride and perchlorethylene by chlorination of aliphatic hydrocarbons and their partially chlorinated derivatives. It has particular regard to a process whereby the production of either carbon tetrachloride or perchlorethylene in predominating proportion, or of one of them to the substantial exclusion of the other, can be controlled at will.

Carbon tetrachloride, perchlorethylene and hexachlorbenzene are the ultimate products of chlorination of lower aliphatic hydrocarbons at temperatures of about 400° C. and above, regardless of the number of carbon atoms in the hydrocarbon molecule. Thus, these compounds can be produced by direct thermal chlorination of methane, ethane, propane, ethylene, propylene, or their partially chlorinated derivatives. Hydrocarbons having 4 or more carbon atoms in the molecule also can be used, but less desirably, due to the greater possibilities of by-product formation. Practically speaking, the hydrocarbons having from 1 to 3 carbon atoms are to be preferred for the purpose. Carbon tetrachloride and perchlorethylene are commercially important products, while hexachlorbenzene at present has little value. Hence, it is a problem in the thermal chlorination of the aforesaid materials to promote the formation of carbon tetrachloride or perchlorethylene, as desired, while effectively limiting or suppressing the formation of hexachlorbenzene.

Various procedures have been described in the art for making either carbon tetrachloride or perchlorethylene by chlorination of the above raw materials, or some of them. The chemical reactions involved are well understood. With respect to methane, ethylene, ethane, propylene and propane the results of the total chlorination of the hydrocarbon are represented by the following equations:

(1)  $CH_4 + 3Cl_2 \rightarrow \tfrac{1}{2}C_2Cl_4 + 4HCl$
(2)  $CH_4 + 4Cl_2 \rightarrow CCl_4 + 4HCl$
(3)  $C_2H_4 + 4Cl_2 \rightarrow C_2Cl_4 + 4HCl$
(4)  $C_2H_4 + 5Cl_2 \rightarrow \tfrac{1}{2}C_2Cl_4 + CCl_4 + 4HCl$
(5)  $C_2H_4 + 6Cl_2 \rightarrow 2CCl_4 + 4HCl$
(6)  $C_2H_6 + 5Cl_2 \rightarrow C_2Cl_4 + 6HCl$
(7)  $C_2H_6 + 6Cl_2 \rightarrow \tfrac{1}{2}C_2Cl_4 + CCl_4 + 6HCl$
(8)  $C_2H_6 + 7Cl_2 \rightarrow 2CCl_4 + 6HCl$
(9)  $C_3H_6 + 6Cl_2 \rightarrow 1\tfrac{1}{2}C_2Cl_4 + 6HCl$
(10) $C_3H_6 + 7Cl_2 \rightarrow C_2Cl_4 + CCl_4 + 6HCl$
(11) $C_3H_6 + 9Cl_2 \rightarrow 3CCl_4 + 6HCl$
(12) $C_3H_8 + 7Cl_2 \rightarrow 1\tfrac{1}{2}C_2Cl_4 + 8HCl$
(13) $C_3H_8 + 8Cl_2 \rightarrow C_2Cl_4 + CCl_4 + 8HCl$
(14) $C_3H_8 + 10Cl_2 \rightarrow 3CCl_4 + 8HCl$ Similar equations can be given for the total chlorination of the partially chlorinated derivatives of the hydrocarbons. Varying with the mol ratio of reacted chlorine to hydrocarbon the chlorination product may be $C_2Cl_4$ or $CCl_4$, or a mixture of the two. The molar proportion of chlorine required theoretically in a particular case depends upon the number of replaceable hydrogen atoms in the molecule of the hydrocarbon or partially chlorinated derivative thereof. When both compounds are formed or are present in the reaction mixture, either one may, according to conditions, be converted to the other according to the equation:

(15)  $2CCl_4 \rightleftarrows C_2Cl_4 + 2Cl_2$

Our observations indicate that Equation 15 represents a reversible reaction, which reaches an equilibrium varying in accordance with conditions of temperature, concentration and other factors. Thus, we have found that it is subject to mass action, and the equilibrium can be forced to the right or left by providing a sufficiently large concentration of $CCl_4$ or $C_2Cl_4$, respectively. This circumstance is of importance in our invention, as will be shown hereinafter.

It is known to the art that an excess of chlorine over the theoretical proportion is favorable to total chlorination reactions of the type in hand, and for practical purposes the use of an excess on the order of 10 to 40 per cent is advantageous in preventing the formation of undesired by-products, such as hexachlorbenzene and tars. In the total chlorination of any particular hydrocarbon, therefore, the proportions shown by the equations need not be strictly adhered to. The identity of the product, under usual operating conditions, is only approximately determined by the proportion of chlorine to hydrocarbon (or replaceable hydrogen of the hydrocarbon), and is more closely controlled by the conditions of temperature and concentration that are maintained. Thus, in the total chlorination of a particular hydrocarbon presumably all of the several reactions shown above may occur, producing both $CCl_4$ and $C_2Cl_4$ in varying proportions, which, however, are capable of control within limits, as will be shown.

The thermal chlorination of the lower aliphatic hydrocarbons to produce $CCl_4$ and $C_2Cl_4$ can be carried out over a considerable temperature range. The art shows temperatures of from about 400° to 700° C. or higher. For those reactions involving either the splitting or the building of carbon-to-carbon bonds temperatures above 500° C. are necessary for a substantial yield of product, preferably between about 550° and 650° C. At higher temperatures the formation of tarry products increases rapidly, and particularly that of hexachlorbenzene, which is generally undesirable. The latter compound, when formed even in small amount, is most troublesome for practical operation of the process. Not only does it represent a waste of starting materials, but also it creates difficulties in the separation of the desired reaction products. It has a moderate solubility in the chlorinated aliphatic hydrocarbons at temperatures near the boiling point, but is only slightly soluble at lower temperatures. In the condensation of the reaction products a content of $C_6Cl_6$ as low as 1 to 2 per cent causes a precipitation of the solid compound in the condenser, which rapidly plugs it up. Owing to the limited solubility, such deposits are difficult to remove, and the necessity for doing so is wasteful of production time and adds to the cost of manufacture. In any commercial process for producing $CCl_4$ and $C_2Cl_4$ by thermal chlorination, the suppression of formation of $C_6Cl_6$ and the disposition of any amounts actually formed are serious problems.

The chlorination reactions with which our invention is concerned are highly exothermic, as is well known. Far more heat is liberated in most cases than the amount required to heat the reacting materials to the reaction temperature, hence the art has been concerned with means and expedients for controlling or absorbing the heat of reaction, in order to prevent an excessive temperature rise which would cause carbonization of the materials and destruction of the desired products. One of the expedients that has been proposed is to dilute the reacting gases with a sufficient volume of inert gas to absorb the excess heat of reaction, but this method leads into difficulties in the recovery of products from the large volume of diluent gas, which causes losses of product and increases costs. In none of the prior art methods, of which we are aware, has the heat of reaction been utilized in a practical way to sustain the reaction temperature without the necessity for external heating or cooling. While the possibility of making the process thermally self-sustaining is evident, it is necessary to provide effective means of controlling the reaction temperature within the desired range, so as to prevent overheating and carbonization.

It is among the objects of the invention to provide a process of chlorinating the aforesaid hydrocarbons and their partially chlorinated derivatives to produce carbon tetrachloride or perchlorethylene, or both of them together, which is thermally self-sustaining and in which the excess heat of reaction is absorbed by dilution of the reaction mixture without diluting the reaction products with uncondensable gases. Another object is to provide a process of the aforesaid character in which the formation of either carbon tetrachloride or perchlorethylene in predominating amount or to the substantial exclusion of the other can be readily controlled. Another object is to repress the formation of hexachlorbenzene and prevent stoppages and other difficulties caused by the presence of the same in the reaction product. Yet another object is to provide a continuous process of producing carbon tetrachloride or perchlorethylene in a single reaction step, which is capable of control by simple means. Other objects and advantages will appear from the following description and annexed drawing, showing a preferred embodiment of the invention.

In said drawing, the single figure is a schematic flow-sheet, showing the movement of materials in the process.

According to our invention the thermal chlorination of the lower aliphatic hydrocarbon, or partially chlorinated derivative thereof, is carried out in gas phase at temperatures between 500° and 700° C., preferably between 550° and 650° C., using sufficient chlorine to provide a moderate excess thereof in the exit gases from the reaction. The molar ratio of $Cl_2/HCl$ in the exit gases should be at least 0.1, but need not exceed about 0.25. In other words, the excess chlorine should be 10 per cent or more of the amount required for the reaction. A greater excess does not hinder the reaction, but has no further advantage. No catalyst is employed. A sufficient volume of the vapors of carbon tetrachloride or perchlorethylene, or a mixture thereof, is initially admixed with the reaction gases to control the temperature of the reaction within the specified range by absorption of surplus heat. The reaction is thermally self-sustaining under the conditions provided, without need for external heating or cooling of the reactor. The formation of carbon tetrachloride or of perchlorethylene as the principal reaction product is controlled by the concentration of carbon tetrachloride and perchlorethylene in the diluent. By using a high concentration of carbon tetrachloride in the diluent the reaction can be directed substantially to the production of perchlorethylene, and, conversely, if a high concentration of perchlorethylene is used in the diluent, the principal product is carbon tetrachloride.

At temperatures below 650° C. very little, if any, hexachlorbenzene is formed, but it is important to remove such small amounts as may be formed before the reaction vapors are condensed. This result is effectively accomplished by quenching the hot exit gases from the reaction in a body of liquid composed largely of perchlorethylene. The liquid cools the gases and partially condenses the vapors, and in particular it condenses and dissolves such hexachlorbenzene as may be present. The liquid is heated to its boiling point by the absorbed heat, so that the vapors of carbon tetrachloride and perchlorethylene pass off to a condenser. The condensate is fractionally distilled to separate one or other of its components. A portion of the distillate, equivalent to the volume of diluent initially added, is returned to the process for reuse, and the remainder is removed as product. In case the process is operated for production of perchlorethylene, the initial diluent and recycled liquid is principally carbon tetrachloride, whereas, if the desired product is carbon tetrachloride, the diluent and recycled liquid is principally perchlorethylene. The uncondensed gases which remain after the condensation of the vapors of carbon tetrachloride and perchlorethylene, consisting principally of hydrogen chloride and excess chlorine, are scrubbed with water to remove hydrogen chloride, and the recovered chlorine is dried and returned to the process.

A preferred mode of operation for carrying out the process of the invention is illustrated diagrammatically by the drawing. An evaporator 1 is charged with carbon tetrachloride or perchlorethylene, or a mixture of the two, and the liquid is heated to boiling by means of calandria 2, which is heated by steam of suitable temperature and pressure. The hydrocarbon feed is introduced into evaporator 1 through line 3, and chlorine is introduced through line 4. The rates of flow of hydrocarbon and chlorine, respectively, are regulated to provide an excess of the latter equal to 10 to 25 per cent above the proportion required for the reaction. The steam input to calandria 2 is regulated to evaporate the liquid in evaporator 1 at a rate to supply a volume of the diluent vapors sufficient to control the reaction temperature of the hydrocarbon and chlorine at the desired point within the range of 500° to 700° C. The gases, chlorine and hydrocarbon, are mixed with the diluent vapors in the vapor space of evaporator 1, and the mixture of gases and vapors is led by pipe 5 to reactor 6, which is maintained at the reaction temperature by the heat of reaction. When the entering gases are subjected to the temperature of the reactor, the reaction of chlorine and hydrocarbon takes place almost instantaneously with formation of carbon tetrachloride or perchlorethylene, according to the concentrations of either of them present in the diluent vapors. Operating under substantially adiabatic conditions, i. e. without addition or loss of heat in the reactor except that contained in the entering and exit gases, the heat generated by the chemical reaction immediately raises the temperature of the entering gases to that of the reactor, while the diluent absorbs sufficient heat to prevent an excessive temperature rise. Reactor 6 is a chamber lined with refractory insulating material to reduce radiation losses to a low figure. It may be provided with means for initially igniting the reaction mixture, such as a spark igniter or electrically heated resistor. After the reaction is once started, it then sustains itself at the desired temperature entirely by the heat of reaction.

The exit gases and vapors from the reaction, consisting substantially of carbon tetrachloride, perchlorethylene, chlorine and hydrogen chloride, pass through pipe 7 and are delivered below the surface of a quenching liquid in still pot 8, or otherwise effectively contacted with the liquid. The quenching liquid consists largely of perchlorethylene, which is heated to its boiling point by the heat absorbed from the hot reaction gases. The quenching liquid condenses and dissolves such small amounts of hexachlorbenzene as may be in the reaction gases, while the vapors of carbon tetrachloride and perchlorethylene pass upwardly into a distilling column 9 thereabove and are condensed. Reflux of condensed liquid from column 9 maintains the liquid level in pot 8 and provides for an overflow through pipe 10 into surge tank 11. Such overflow of liquid continually removes the dissolved hexachlorbenzene and prevents its accumulation and precipitation in pot 8.

The vapors of carbon tetrachloride and perchlorethylene are fractionated in column 9, vapors of carbon tetrachloride passing off overhead through pipe 12 to condenser 13. The condensate flows into separator 14 where the liquid is separated from the uncondensed gases consisting substantially of chlorine and hydrogen chloride. All or a portion of the liquid condensate from separator 14 may be returned to column 9 as reflux, depending upon whether perchlorethylene or carbon tetrachloride is the desired product. If perchlorethylene is to be removed as product, all of the liquid condensate will be returned as reflux. On the other hand, if carbon tetrachloride is the desired product, it may be withdrawn at outlet 15, and only a portion of the condensate will be returned to the column as reflux.

The gaseous mixture of chlorine and hydrogen chloride passes through pipe 16 to a water scrubber 17, wherein the water absorbs the hydrogen chloride, which is removed as an aqueous solution from the bottom of the scrubber. The chlorine passes from the top of scrubber 17 through pipe 18 to a sulphuric acid dryer 19, which removes moisture from the chlorine. The dried gas, consisting principally of chlorine but containing a small amount of uncondensed vapors, is returned through pipe 20 to the chlorine inlet pipe 4. The gas flow through the scrubber and dryer and back to the chlorine inlet can be conveniently maintained by means of an ejector 12, which is operated by the pressure of make-up chlorine introduced into the system through pipe 4. A purge line 22 branches off from pipe 20, to permit purging from time to time, as required, to remove inert gases, e. g. nitrogen or carbon dioxide, which may accumulate in the system.

Perchlorethylene is removed from column 9 through pipe 23 as a liquid side-cut in admixture with carbon tetrachloride. Pipe 23 feeds into a fractionating column 24, the liquid in the base of which is heated by steam calandria 25. The operation of column 24 depends upon the product to be recovered from the process. When the product is to be carbon tetrachloride, the latter may be separated in column 24 instead of from column 9, as previously mentioned. In such case the column is operated to vaporize carbon tetrachloride overhead, which passes through pipe 26 to condenser 27. A portion of the condensate is returned to the column as reflux, while the remainder may be removed as product at outlet 28. Perchlorethylene is removed from the bottom of column 24 as liquid, which is conveyed by pipe 31 to surge tank 11 for recycle in the process. If perchlorethylene is the desired product, column 24 is operated to distill a mixture of $CCl_4$ and $C_2Cl_4$ as overhead, taking off as bottom discharge only sufficient liquid to dispose of heavy ends, which are returned to tank 11 through pipe 31. The overhead condensate from condenser 27 passes through pipe 29 to fractionating column 30, which is heated by steam calandria 32. The overhead from column 30 is carbon tetrachloride, which is condensed in condenser 33, part of the condensate being returned to the column as reflux, the remainder being conveyed by pipe 34 to surge tank 11. Perchlorethylene is drawn off as liquid product from the lower part of column 30 through pipe 35.

The liquid streams passing to surge tank 11 through pipes 10, 31 and 34 are mixed in the tank and constitute the liquid diluent to be recycled in the process. The liquid contains not only the recycled carbon tetrachloride or perchlorethylene, but also the heavy ends from the several distilling columns, including in addition to hexachlorbenzene, hexachlorethane and, in the chlorination of propane, polychlorinated propanes of higher boiling point than perchlorethylene. All of these compounds, except hexachlorbenzene, can be converted to carbon tetrachloride or perchlorethylene when returned to the reaction. The volume of liquid flowing into this tank in a unit of time corresponds to the volume evaporated during the same time in evaporator 1 to dilute the reaction gases. The liquid in tank 11 is returned to evaporator 1 through pipe 36, where it is re-vaporized and the vapors mixed with the incoming feed of chlorine and hydrocarbon. The accumulation of hexachlorbenzene in the system is prevented by continually bleeding off a stream of the liquid in evaporator 1 through pipe 37 to a column 38 of still 39. The more volatile portion of the withdrawn liquid is vaporized and returned to evaporator 1 through pipe 40, while the heavy residue consisting mostly of hexachlorbenzene and some hexachlorethane accumulates in still 39, from which it is discharged from time to time through drain 41.

In the operation of the continuous process, as described, the most important factor is the regulation of the relative volumes of hydrocarbon, chlorine and diluent vapor. The hydrocarbon and chlorine feeds are metered to supply the relative volumes, according to type of feed stock, as indicated by the Equations 1–14 above. The excess of chlorine to be employed is substantially provided during operation by the recovery and recycling of the same, only a small make-up allowance being needed to cover losses. The required volume of diluent vapor for controlling the reaction temperature varies somewhat with the actual temperature maintained, and also with the reactor design and heat losses from the same. With a well insulated reactor, and employing a hydrocarbon as the material to be chlorinated, the volume of the diluent vapors is on the order of about 70 to 75 per cent of the combined volumes of hydrocarbon and chlorine in the feed. These proportions are to be regarded as being illustrative rather than as a limitation, being subject to empirical as well as theoretical factors. The proportion of diluent will be lower when a partially chlorinated hydrocarbon is the raw material, instead of a hydrocarbon. In any case, the higher the proportion of diluent vapors the lower is the temperature of the reaction zone, and vice versa. As previously stated, the reaction temperature, measured at the reactor outlet, should be between 500° and 700° C., preferably between 550° and 650° C. In practice this temperature can be controlled simply by controlling the heat input to the evaporator, increasing or lowering the rate of vaporization of the diluent to diminish or raise the reaction temperature.

The quenching of the hot gaseous reaction products by contact with a liquid body composed of highly chlorinated hydrocarbons, chiefly perchlorethylene, is important for eliminating such small amounts of hexachlorbenzene as may have been formed, and precludes the troubles that would otherwise occur due to the deposition of the solid in distilling columns, condensers and pipes. The hot quenching liquid holds the hexachlorbenzene in solution and the continuous overflow of quenching liquid from the still pot prevents the concentration of hexachlorbenzene from rising to the point where precipitation would occur. The presence of perchlorethylene as the principal component of the quenching liquid results naturally from operation of the process, since it, as the higher boiling compound, tends to accumulate as liquid in the still pot by reflux from the column, while the lower boiling compound, carbon tetrachloride, is held in the upper part of the column.

Another advantage of quenching the reaction gases in the manner shown is that heat contained in the gases is transferred to the quenching liquid and utilized to operate the column, so as to obtain at least a partial separation of products. By making the column tall enough for efficient fractionation, substantially pure carbon tetrachloride may be taken off overhead and removed as product, when so desired. When the process is operated for production of perchlorethylene the column is used as a scrubber, with total reflux of overhead condensate, to separate the liquid reaction products from gaseous chlorine and hydrogen chloride.

When operating the process for production of perchlorethylene, the recycled diluent in the system is largely carbon tetrachloride, although a minor proportion of perchlorethylene is continuously recycled in the overflow from the quenching pot. The recycled carbon tetrachloride is derived mostly from the return flow in pipe 34 from fractionating column 38. On the other hand, when the process is operated to produce mainly carbon tetrachloride, the recycled diluent in the system is largely perchlorethylene. The return flow of perchlorethylene is derived from the overflow from the quenching pot through pipe 10 and the underflow from column 24 through pipe 31.

The following examples show for illustrative purposes two different modifications of the operation of the process, in which (1) the product is principally carbon tetrachloride and (2) the product is perchlorethylene.

EXAMPLE 1

Propane and chlorine were continuously fed into an evaporator in which they were mixed with the vapors of a diluent consisting chiefly of perchlorethylene but containing a small proportion of carbon tetrachloride. The proportions of the various compounds in the feed are shown in Table 1 below. The chlorine feed was composed of new and recycled gas, as shown. The mixed gases and vapors, at a temperature of about 130° C., were introduced into a reaction chamber maintained at a temperature of approximately 610° C., measured as the temperature of the exit gas therefrom, by the exothermic heat of reaction. The hot reaction gases were immediately quenched in a liquid body composed substantially of perchlorethylene maintained at a temperature of approximately 120° C. by the heat absorbed from the hot gases. The vapors of carbon tetrachloride and perchlorethylene were condensed, to separate them from hydrogen chloride and unreacted chlorine, and fractionally distilled in the manner above described, recycling a volume equal to that of the diluent, and separating the remainder as product. The uncondensed gases were scrubbed with water to absorb hydrogen chloride, and the residual chlorine was dried by contact with sulphuric acid and returned to the reaction. The proportions of materials used and products recovered, expressed as rate of flow in mols per unit of time, are shown in the following table:

Table 1

| Material | Description | Mols | |
|---|---|---|---|
| Propane | | | 1.0 |
| Chlorine | New | 8.5 | |
| | Recycle | 1.26 | |
| | Total | | 9.76 |
| Diluent | $CCl_4$ | 0.95 | |
| | $C_2Cl_4$ | 7.0 | |
| | Total | | 7.95 |
| Product | $CCl_4$ | 1.52 | |
| | $C_2Cl_4$ | 0.67 | |
| | Total | | 2.19 |
| | $C_6Cl_6$ | | 0.05 |

Of the propane consumed, 50.6 per cent was converted to carbon tetrachloride, and 44.4 per cent to perchlorethylene, for a total conversion of 95 per cent.

Under operating conditions described in this example approximately 70 mol per cent of the product was carbon tetrachloride and the remainder substantially perchlorethylene. By increasing the proportion of diluent and the proportion of perchlorethylene in the recycled diluent, a higher proportionate yield of carbon tetrachloride would be obtained. Likewise a slightly higher proportion of chlorine to propane is favorable to a higher yield of carbon tetrachloride, in accordance with the theoretical proportions shown in Equations 12–14 above.

EXAMPLE 2

Propane was chlorinated in similar manner at a temperature of about 625° C., except that a slightly lower proportion of chlorine to propane was used, and the diluent used and recycled in the process was composed principally of carbon tetrachloride. The products were recovered as before. The materials employed and products recovered, in mols, are shown in the following table:

*Table 2*

| Material | Description | Mols |
|---|---|---|
| Propane | | 1.0 |
| Chlorine | New | 7.0 |
| | Recycle | 2.27 |
| | Total | 9.27 |
| Diluent | $CCl_4$ | 7.0 |
| | $C_2Cl_4$ | 0.3 |
| | Total | 7.3 |
| Product | $C_2Cl_4$ | 1.41 |
| | $C_6Cl_6$ | 0.02 |

The product consisted substantially of perchlorethylene, the yield being 94 per cent, based on propane used.

EXAMPLE 3

When methane is chlorinated according to the procedure described in Example 2 to produce perchlorethylene, suitable proportions of materials, and the product recovered, are shown in the following table:

*Table 3*

| Material | Description | Mols |
|---|---|---|
| Methane | | 1.0 |
| Chlorine | New | 2.87 |
| | Recycle | 0.63 |
| | Total | 3.5 |
| Diluent | $CCl_4$ | 3.10 |
| | $C_2Cl_4$ | 0.37 |
| | Total | 3.47 |
| Product | $C_2Cl_4$ | 0.5 |
| | $C_6Cl_6$ | 0.02 |

The operation of the process can be varied to yield either carbon tetrachloride or perchlorethylene as the principal or sole product, or a mixture of the two in any desired proportion, by selection of the product to be withdrawn and recycling the remainder of the chlorhydrocarbons in the system. A sufficient inventory of the chlorinated hydrocarbons is constantly recycled to serve as diluent to control the reaction temperature, while the amount of product withdrawn corresponds closely, on a mol basis, to the equivalent of the hydrocarbon or partially chlorinated hydrocarbon that is fed to the process. By withdrawing as product only one of the chlorinated compounds, the other remains and accumulates in the system and by mass action effect controls the reaction equilibrium for the formation preferentially of the compound which is withdrawn as product. Similarly, when a mixture of carbon tetrachloride and perchlorethylene is withdrawn as product, a complementary mixture remains in the system as recycle inventory to control the reaction equilibrium for formation of a mixed product in the proportions withdrawn from the system.

While the examples show the chlorination of propane and methane, similar results are obtained by chlorinating in like manner ethane, ethylene, acetylene, propylene, or partially chlorinated derivatives thereof, such as methyl chloride, methylene chloride, chloroform, ethyl chloride, ethylene chloride, propyl chloride, propylene chloride, etc., and mixtures of any of them. The proportion of chlorine to be used in the process is adjusted to the particular feed stock so as to correspond on a mol basis to the number of replaceable hydrogen atoms in the compound or compounds to be chlorinated and to the desired product, whether carbon tetrachloride, perchlorethylene, or a mixture of them, as in Equations 1–14, allowing for an excess of about 10 to 25 per cent of chlorine in the exit gases from the reaction.

The relative volume of the diluent mixture of carbon tetrachloride and perchlorethylene to be used in any particular case depends upon the combined volumes of hydrocarbon (or partially chlorinated hydrocarbon) and of chlorine fed to the process, but is modified to a certain extent by the reaction temperature which is to be maintained. That is, the higher the temperature, the lower the relative volume of diluent, and conversely. An empirical factor to be considered, also, is the reactor and the degree to which it is insulated against heat losses by radiation. The higher the radiation loss, the lower is the volume of diluent required to control the reaction temperature. In the above examples, where a highly insulated reactor was used, the volumetric ratio of diluent to the combined volumes of hydrocarbon and chlorine in the feed was 0.73 in Example 1 and 0.71 in Example 2. This ratio could be slightly lower if a higher reaction temperature were to be maintained, or if the heat losses from the reactor were greater. Conversely, the ratio could be somewhat higher, if the reaction temperature were lower, or if the radiation losses were lower. Generally speaking, when a hydrocarbon is to be chlorinated, the ratio of diluent vapors to the combined volume of hydrocarbon and chlorine may vary, for example, from about 0.60 to 0.80, usually between 0.70 and 0.75. When the feed stock contains a high proportion of partially chlorinated hydrocarbons, the proportion of diluent vapors required for temperature control will be lowered roughly in proportion to the smaller number of replaceable hydrogen atoms in the molecule of the partially chlorinated hydrocarbon. In any particular case the relative volume of the diluent will be adjusted in practicing the process so as to maintain the desired reaction temperature. Such adjustment can in fact be made without necessity for knowing the exact volume ratio of diluent vapor, simply by regulating the heat input to the evaporator to increase or decrease the rate of vaporization of the diluent by an amount sufficient to hold the reactor temperature at the desired point, as already described.

A particular advantage of our process is the substantial elimination of by-products. Except for the comparatively small amount of hexachlorbenzene which is formed and removed, practically all chlorinated hydrocarbons contained in the reaction gases, other than the desired product, are recycled with the diluent to be converted into such product.

We claim:

1. A process for the total chlorination of aliphatic hydrocarbons having from 1 to 3 carbon atoms in the molecule and the partially chlorinated derivatives thereof, which comprises forming a gaseous mixture of the compound to be chlorinated, chlorine and a diluent composed predominantly of a chlorinated hydrocarbon from the group consisting of carbon tetrachloride, perchlorethylene and mixtures thereof, in which chlorine is present in excess of the amount required for complete chlorination of said compound and the diluent is present in relative volume sufficient to control the temperature of the ensuing reaction within the range of 500° to 700° C. substantially without external heating or cooling, passing the gaseous mixture through an insulated zone maintained at a temperature between 500° and 700° C. by the heat of reaction, in which chlorination of said compound occurs with formation of at least one of the compounds carbon tetrachloride and perchlorethylene, quenching and cooling the exit gases from the reaction by contact with a liquid body composed of the higher boiling chlorinated hydrocarbons contained in the reaction gases, condensing the chlorinated hydrocarbons contained in the cooled gases issuing from the quenching step, separating the condensate, returning to the first step a fraction of the condensate volumetrically equivalent to the diluent therein, and withdrawing the remaining fraction as product.

2. Process according to claim 1, in which the condensate is fractionated to obtain a product fraction composed substantially of one of the compounds carbon tetrachloride and perchlorethylene and the remainder of the condensate, which is returned to the first step, is composed principally of the other of said compounds.

3. Process according to claim 1, in which the uncondensed gases and vapors issuing from the quenching step are fractionated by means of the heat contained in the reaction gases to obtain a faction composed substantially of carbon tetrachloride and a mixed fraction composed principally of carbon tetrachloride and perchlorethylene.

4. Process according to claim 1, in which a portion of the quenching liquid is continuously drawn off, hexachlorbenzene contained in such withdrawn portion is separated therefrom, and the remainder is added to the portion of condensate returned to the first step.

5. Process according to claim 1, in which the volume of quenching liquid is maintained against loss by reflux of chlorinated hydrocarbons condensed in the condensing step following the quenching step.

6. Process according to claim 1, in which the diluent is composed principally of perchlorethylene, the product fraction is composed substantially of carbon tetrachloride, and the condensate returned to the first step is composed principally of perchlorethylene.

7. Process according to claim 1, in which the diluent is composed principally of carbon tetrachloride, the product fraction is composed substantially of perchlorethylene, and the condensate returned to the first step is composed principally of carbon tetrachloride.

8. Process according to claim 1, in which the compound to be chlorinated is a saturated aliphatic hydrocarbon containing from 1 to 3 carbon atoms in the molecule.

9. Process according to claim 1, in which the compound to be chlorinated is substantially propane.

10. Process according to claim 1, in which the compound to be chlorinated is substantially methane.

ROBERT G. HEITZ.
WILLIAM E. BROWN.

REFERENCES CITED

The following references are of record in the file of this patent:

UNITED STATES PATENTS

| Number | Name | Date |
|---|---|---|
| 1,947,491 | Reilly | Feb. 20, 1934 |
| 2,034,292 | Grebe et al. | Mar. 17, 1936 |
| 2,160,574 | Henning | May 30, 1939 |
| 2,178,622 | Basel et al. | Nov. 7, 1934 |
| 2,255,752 | Basel et al. | Sept. 16, 1941 |